United States Patent
Cidon et al.

(10) Patent No.: US 9,373,001 B2
(45) Date of Patent: Jun. 21, 2016

(54) DISTRIBUTED ENCRYPTION AND ACCESS CONTROL SCHEME IN A CLOUD ENVIRONMENT

(71) Applicant: Barracuda Networks, Inc., San Jose, CA (US)

(72) Inventors: Asaf Cidon, San Francisco, CA (US); Israel Cidon, Palo Alto, CA (US); Lior Gavish, San Francisco, CA (US); Prabandham Madan Gopal, Los Altos, CA (US); Chandrashekhar Shetty, Naperville, IL (US)

(73) Assignee: BARRACUDA NETWORKS, INC., Campbell, CA (US)

( * ) Notice: Subject to any disclaimer, the term of this patent is extended or adjusted under 35 U.S.C. 154(b) by 0 days.

(21) Appl. No.: 14/203,683

(22) Filed: Mar. 11, 2014

(65) Prior Publication Data
US 2014/0258719 A1  Sep. 11, 2014

Related U.S. Application Data
(63) Continuation-in-part of application No. 13/726,641, filed on Dec. 26, 2012.

(51) Int. Cl.
*G06F 7/00* (2006.01)
*G06F 17/30* (2006.01)
*G06F 21/62* (2013.01)

(52) U.S. Cl.
CPC ...... *G06F 21/6209* (2013.01); *G06F 17/30091* (2013.01); *G06F 17/30194* (2013.01); *G06F 21/62* (2013.01)

(58) Field of Classification Search
None
See application file for complete search history.

(56) References Cited

U.S. PATENT DOCUMENTS

| | | | | |
|---|---|---|---|---|
| 7,324,648 | B1* | 1/2008 | Deaver | H04N 5/913 380/225 |
| 7,512,810 | B1* | 3/2009 | Ryan | 713/189 |
| 8,683,602 | B2* | 3/2014 | Waller | G06F 21/10 380/277 |
| 2004/0064710 | A1* | 4/2004 | Vainstein | 713/189 |
| 2004/0151318 | A1* | 8/2004 | Duncanson, Jr. | 380/277 |
| 2005/0120199 | A1* | 6/2005 | Carter | 713/150 |
| 2012/0278635 | A1* | 11/2012 | Hars et al. | 713/193 |
| 2014/0230007 | A1* | 8/2014 | Roth | G06F 21/602 726/1 |
| 2014/0270178 | A1* | 9/2014 | Kiang | H04L 9/0822 380/281 |

OTHER PUBLICATIONS

Alysson Bessani et al, "DEPSKY: Dependable and Secure Storage in a Cloud-of-Cloud", ACM Transaction on Storage, vol. 9, No. 4, Article 12, Nov. 2013, 33 pages.*

* cited by examiner

*Primary Examiner* — Uyen Le
(74) *Attorney, Agent, or Firm* — Duane Morris LLP; Daivd T. Xue

(57) ABSTRACT

System, computer readable medium and method for decryption. The method may include receiving, by a third computerized system and from a fourth computerized system, a first encrypted file entity key and signed access metadata. The first encrypted file entity key is created by encrypting a file entity key by a first computerized system using an encryption key of a second computerized system. The signed access metadata is signed by the file entity key. The encrypted file entity is created by encrypting a file entity by the first computerized system using the file entity key. Sending, by the third computerized system, the signed access metadata and the first encrypted file entity key to the second computerized system. Receiving a response from the second computerized system. Determining, based on the response from the second computerized system, whether to facilitate a decryption of the encrypted file entity by the fourth computerized entity.

19 Claims, 14 Drawing Sheets

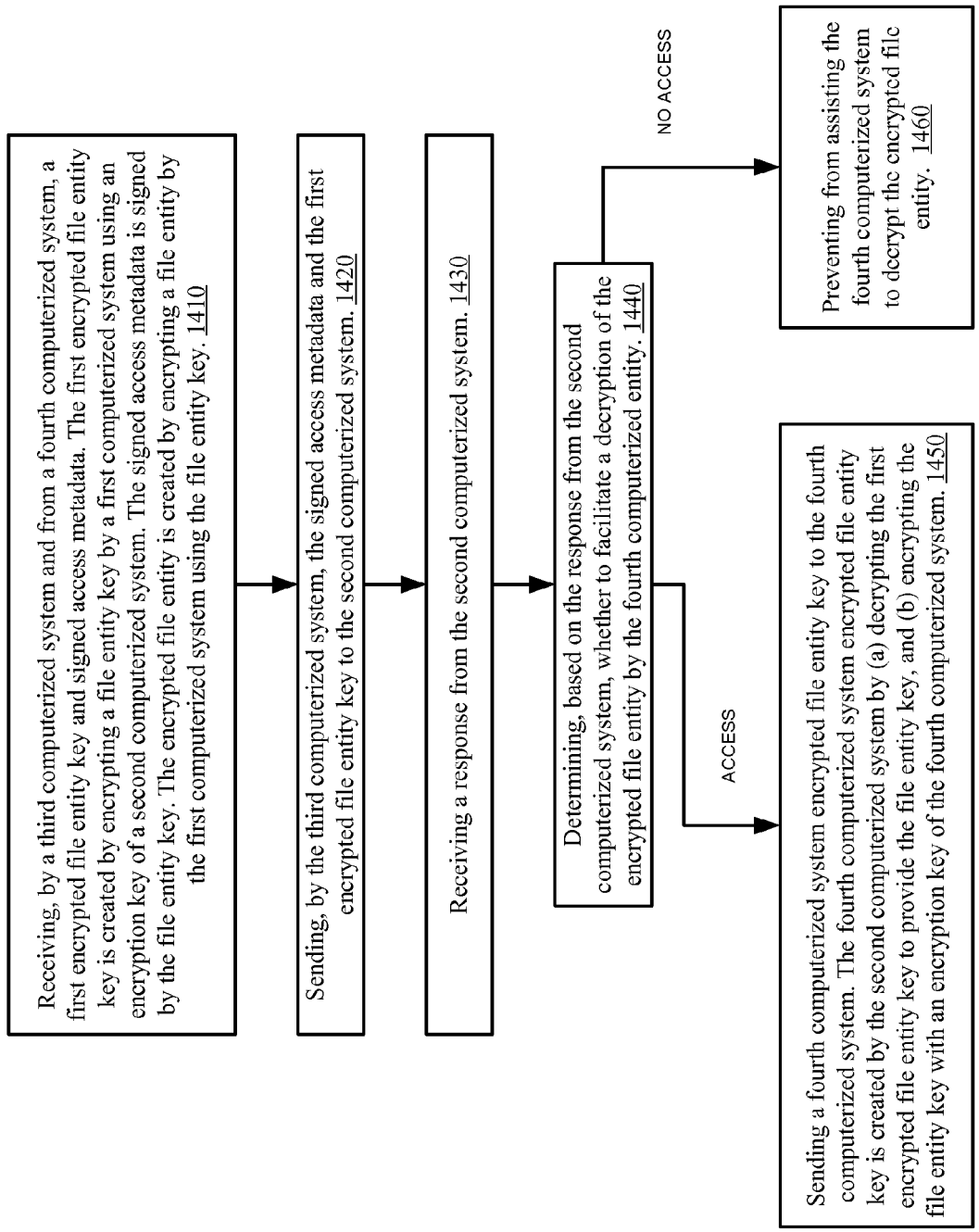

DISTRIBUTED ENCRYPTION AND ACCESS CONTROL SCHEME IN A CLOUD ENVIRONMENT

RELATED APPLICATIONS

This application is a continuation in part of U.S. patent application Ser. No. 13/726,641 filing date Dec. 26, 2012 titled "ENCRYPTING FILES WITHIN A CLOUD COMPUTING ENVIRONMENT" which is incorporated herein by reference.

BACKGROUND OF THE INVENTION

An Enterprise Encryption Cloud Service (EECS) is a cloud hosted Software as a Service (SaaS service that manages the access control on behalf of an enterprise by serving as a key arbitration facility between users, their devices and encrypted business data. In particular, such data consist of files, (e.g., documents, presentations, reach-media), that need be shared among employees and business partners, using multiple mobile devices (e.g., iPHONE, iPAD, MS Windows laptop, Mac), through email (e.g. Gmail, Outlook, Hotmail), cloud file sharing (e.g., Dropbox, Box, Google Drive), vertical enterprise applications (e.g., Salesforce, Workday) or social media (e.g. Facebook, Chatter, Jive).

Examples of EECS vendors are Sookassa and the enterprise offerings of NcryptedCloud and SafeMonk.

The EECS role is to secure by encryption files stored on cloud services and mobile devices, while also permitting managed sharing of these files with other employees and external business partners as well as maintaining enterprise ownership of these files and the ability to decrypt each and every file when required.

An enterprise needs centralized decryption ability to all its encrypted files regardless of the identity or accessibility of the users or devices that originally encrypted the data. The enterprise must be able to gain access to its business data even in cases where users have left the enterprise or devices are lost or stolen.

Enterprises also need centralized emergency decryption ability for all their encrypted files, in case the EECS fails or go out of business. Enterprises need to be able to selectively block access (e.g, decryption privileges) to files at any point based on user identity and file characteristics. It also need to observe and record access attempts, especially those related to subpoena and court orders. In particular, it needs to make files' encryption keys invisible to the organization who operates the EECS, so no EECS employee or a third party intruder can get the keys to decrypt enterprise files.

SUMMARY

A method, a system and a non-transitory computer readable medium are provided for participating in decrypting a file.

According to an embodiment of the invention there is provided a method that may include: (I) Receiving, by a third computerized system and from a fourth computerized system, a double encrypted file entity key and signed access metadata. The double encrypted file entity key is created by encrypting a first encrypted file entity key by a first computerized system using an encryption key of the third computerized system. The first encrypted file entity key is created by encrypting a file entity key by the first computerized system using an encryption key of a second computerized system. The signed access metadata is signed by the first encrypted file entity key. The encrypted file entity is created by encrypting a file entity by the first computerized system using the file entity key. (II) Determining, by the third computerized system and in response to the signed access metadata whether the fourth computerized system is entitled to decrypt the file entity. (III) If NO—preventing from assisting the fourth computerized system to decrypt the encrypted file entity. (IV) If YES—(a) decrypting, by the third computerized system, the double encrypted file entity key to provide the first encrypted file entity key; (b) sending the first encrypted file entity key to the second computerized system; (c) receiving a fourth computerized system encrypted file entity key; The fourth computerized system encrypted file entity key is created by the second computerized system by decrypting the first encrypted file entity key to provide the file entity key, and encrypting the file entity key with an encryption key of the fourth computerized system; and (d) sending to the fourth computerized system the fourth computerized system encrypted file entity key.

According to an embodiment of the invention a method may be provided and may include (I) Receiving, by a third computerized system and from a fourth computerized system, a first encrypted file entity key and signed access metadata. The first encrypted file entity key is created by encrypting a file entity key by a first computerized system using an encryption key of a second computerized system. The signed access metadata is signed by the file entity key. The encrypted file entity is created by encrypting a file entity by the first computerized system using the file entity key. (II) Sending, by the third computerized system, the signed access metadata and the first encrypted file entity key to the second computerized system. (III) Receiving a response from the second computerized system. (IV) Determining, based on the response from the second computerized system, whether to facilitate a decryption of the encrypted file entity by the fourth computerized entity. (V) If YES—sending a fourth computerized system encrypted file entity key to the fourth computerized system. The fourth computerized system encrypted file entity key is created by the second computerized system by (a) decrypting the first encrypted file entity key to provide the file entity key, and (b) encrypting the file entity key with an encryption key of the fourth computerized system. (VI) If NO—preventing from assisting the fourth computerized system to decrypt the encrypted file entity.

There may be provided a computer (such as a third computerized system or entity) that may include a memory, an interface and a processor. The interface may be arranged to receive from a fourth computerized system, a double encrypted file entity key and signed access metadata; wherein the double encrypted file entity key is created by encrypting a first encrypted file entity key by a first computerized system using an encryption key of the third computerized system; wherein the first encrypted file entity key is created by encrypting a file entity key by the first computerized system using an encryption key of a second computerized system; wherein the signed access metadata is signed by the first encrypted file entity key; wherein the encrypted file entity is created by encrypting a file entity by the first computerized system using the file entity key. The processor may be arranged to determine in response to the signed access metadata whether the fourth computerized system is entitled to decrypt the file entity. If it is determined that the fourth computerized system is not entitled to decrypt the file entity then the computer may be arranged to prevent from assisting the fourth computerized system to decrypt the encrypted file entity. If it is determined that the fourth computerized system is entitled to decrypt the file entity then: the processor may be arranged to decrypt the double encrypted file entity key to provide the first encrypted file entity key; the interface may be arranged to send the first encrypted file entity key to the second computerized system and to receive a fourth computerized system encrypted file entity key; wherein the fourth computerized system encrypted file entity key is created by the second computerized system by (a) decrypting the first encrypted file entity key to provide the file entity key, and (b) encrypting the file entity key with an encryption key of the fourth computerized system; and to send to the fourth computerized system the fourth computerized system encrypted file entity key.

There may be provided a computer (such as a third computerized system or entity) that may include a memory, an interface and a processor. The interface may be arranged to receive from a fourth computerized system, a double encrypted file entity key and signed access metadata. The double encrypted file entity key is created by encrypting a first encrypted file entity key by a first computerized system using an encryption key of the third computerized system. The first encrypted file entity key is created by encrypting a file entity key by the first computerized system using an encryption key of a second computerized system. The signed access metadata is signed by the first encrypted file entity key. The encrypted file entity is created by encrypting a file entity by the first computerized system using the file entity key. (II) The processor may be arranged to determine in response to the signed access metadata whether the fourth computerized system is entitled to decrypt t the file entity. (III) If NO—the computer may be arranged to prevent from assisting the fourth computerized system to decrypt the encrypted file entity. (IV) If YES—(a) the processor may be arranged to decrypt the double encrypted file entity key to provide the first encrypted file entity key; (b) the interface may be arranged to send the first encrypted file entity key to the second computerized system, to receive a fourth computerized system encrypted file entity key; The fourth computerized system encrypted file entity key is created by the second computerized system by decrypting the first encrypted file entity key to provide the file entity key. (c) The processor may be arranged to encrypting the file entity key with an encryption key of the fourth computerized system. (d) The interface may be arranged to send to the fourth computerized system the fourth computerized system encrypted file entity key.

The file entity to be decrypted may be the entire file or a first portion of the file. The file may include a second portion that is not encrypted.

The method may include preventing the third computerized system from accessing the file key.

The first, second, third and fourth computerized entities may differ from each other.

The signed access metadata may be generated during the encryption of the file.

The method may include determining not to facilitate the decryption if the response of the second computerized system indicates that the signed access data is invalid.

The method may include determining whether to facilitate the decryption of the encrypted file entity by the fourth computerized entity in response to a content of the signed access data if the response indicates that the signed access data is valid.

The signed access metadata may include the identity of the first computerized system. The signed access metadata may include information about a group of one or more computerized entities that are entitled to decrypt the encrypted file portion.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 14 illustrates a method according to an embodiment of the invention.

Figure 1:
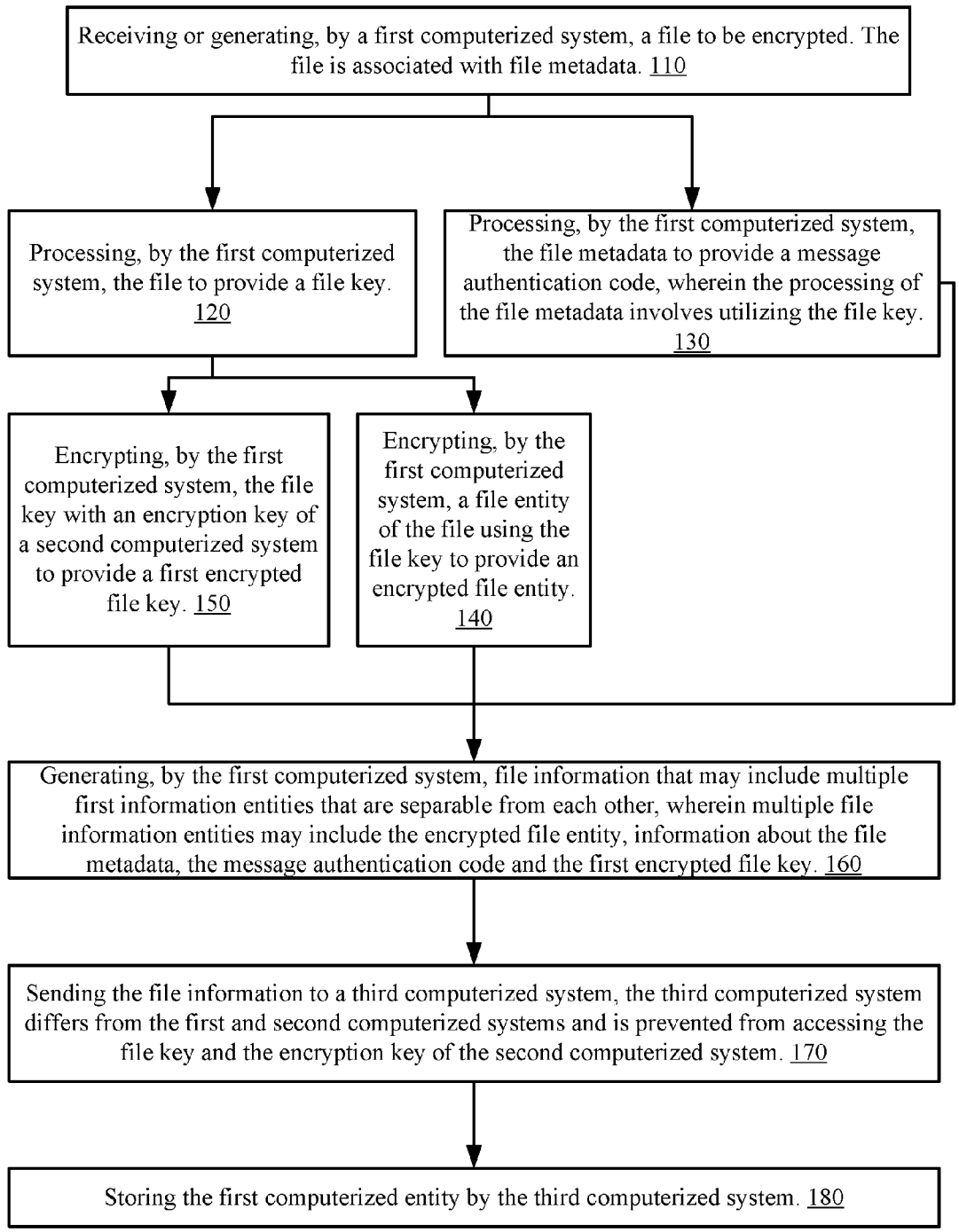
FIGS. 1-3 illustrate a method according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

There are provided methods, systems and non-transitory computer readable media for encryption.

The term computerized system has its regular meaning and may refer to a system that has one or more computers. A computerized system is capable of executing instructions stored in a non-transitory media. Non-limiting examples of computerized systems include a one or more computers, one or more servers, and the like.

A decryption key is a key that is used for decrypting content. It can be, for example a private key of an asymmetrical cryptosystem or a key of a symmetrical cryptosystem.

An encryption key is a key that is used for encrypting content. It can be, for example a public key of an asymmetrical cryptosystem or a key of a symmetrical cryptosystem.

Figure 2:
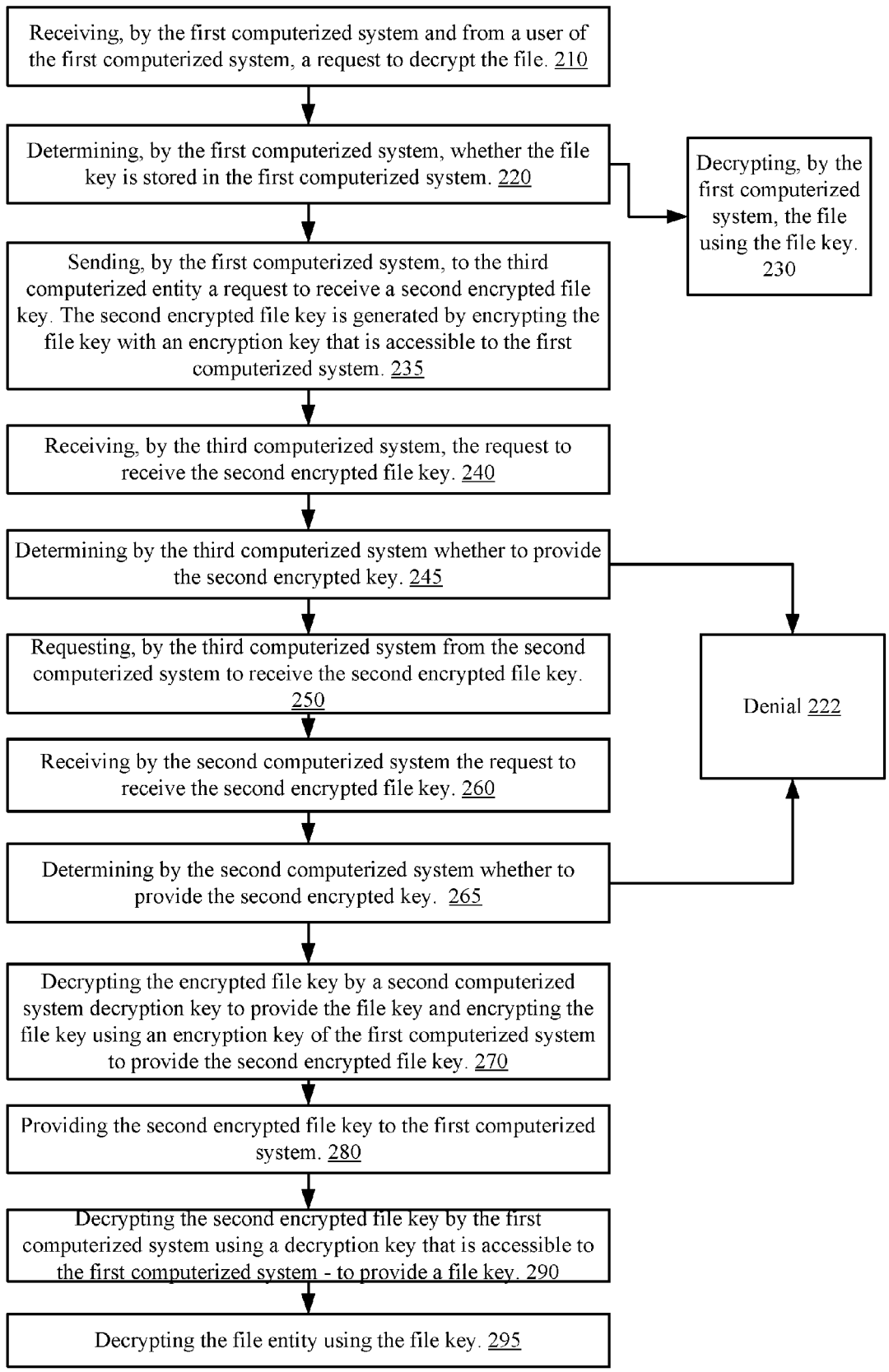
Figure 3:
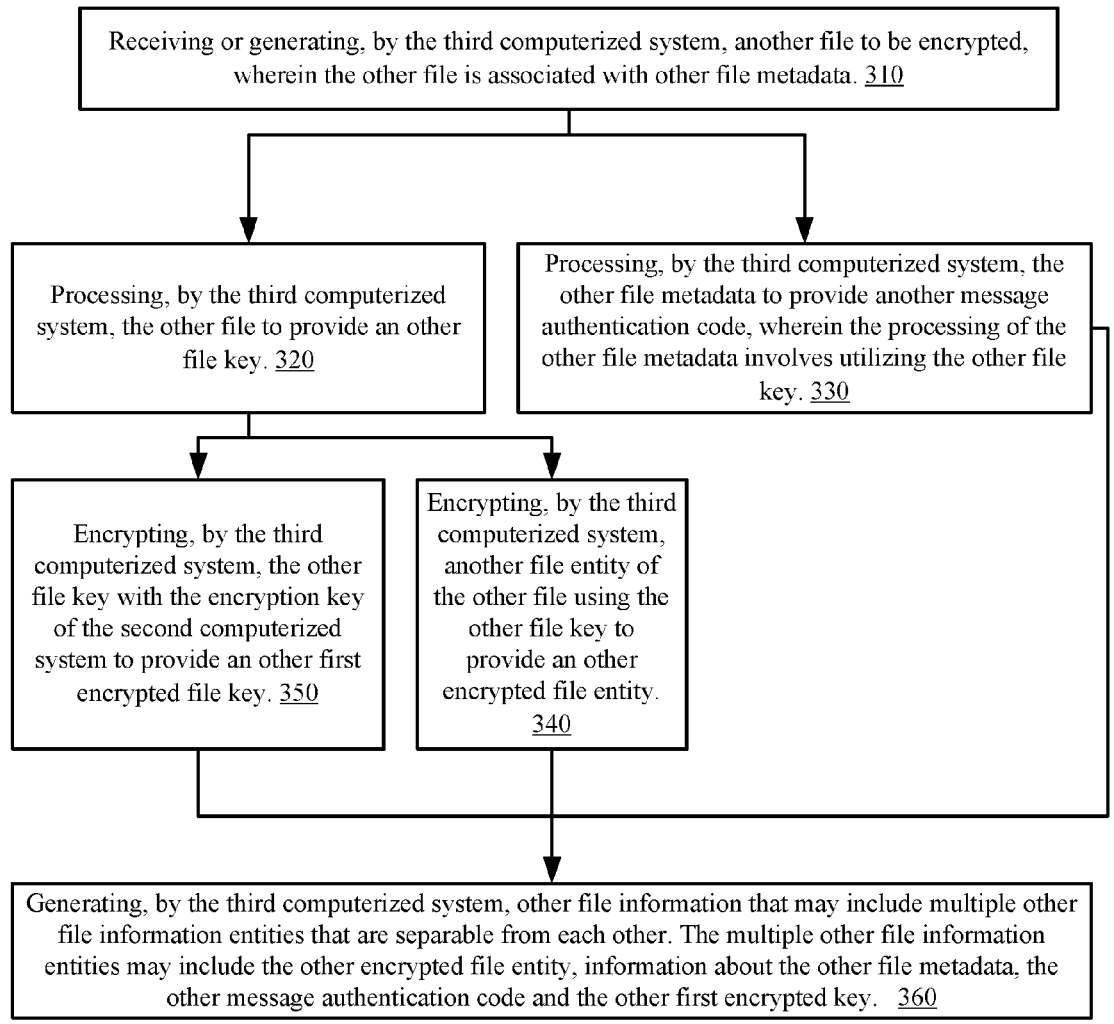

FIGS. 1-3 illustrate method 100 according to an embodiment of the invention.

Method 100 may start by stage 110 of receiving or generating, by a first computerized system, a file to be encrypted. The file is associated with file metadata.

The file metadata may include, for example, file access control metadata.

Stage 110 may be followed by stages 120 and 130.

Stage 120 may include processing, by the first computerized system, the file to provide a file key. This may include applying a hash function.

Stage 130 may include processing, by the first computerized system, the file metadata to provide a message authentication code, wherein the processing of the file metadata involves utilizing the file key.

Stage 120 may be followed by stages 140 and 150.

Stage 140 may include encrypting, by the first computerized system, a file entity of the file using the file key to provide an encrypted file entity. The file entity may include the entire file or a portion of the file. In the latter case another portion of the file is left non-encrypted. For simplicity of explanation it is assumed that the file entity is the file itself.

Stage 150 may include encrypting, by the first computerized system, the file key with an encryption key of a second computerized system to provide a first encrypted file key.

Stages 130, 140 and 150 may be followed by stage 160 of generating, by the first computerized system, file information that may include multiple first information entities that are separable from each other, wherein multiple file information entities may include the encrypted file entity, information about the file metadata, the message authentication code and the first encrypted file key. The generating may include encoding. The term separable means that a computerized entity that receives the file information may separate (for example by parsing) the file information entities from each other.

If the file includes a non-encrypted portion then it may be regarded as file information entity and may be a part of the file information.

Stage 160 may be followed by stage 170 of sending the file information to a third computerized system, the third computerized system differs from the first and second computerized systems and is prevented from accessing the file key and the encryption key of the second computerized system.

Stage 170 may be followed by stage 180 of storing the first computerized entity by the third computerized system.

Stages 110-180 may be executed for each file to be encrypted. Thus, stage 180 may be followed (dashed arrow) by stage 110.

Method 100 may also include a sequence of stages that starts by stage 210 of receiving, by the first computerized system and from a user of the first computerized system, a request to decrypt the file.

Stage 210 may be followed by stage 220 of determining, by the first computerized system, whether the file key is stored in the first computerized system.

If it determined that the file key is stored in the first computerized system then stage 220 is followed by stage 230 decrypting, by the first computerized system, the file using the file key.

If it determined that the file key is not stored in the first computerized system then stage 220 is followed by stage 235 of sending, by the first computerized system, to the third computerized entity a request to receive a second encrypted file key. The second encrypted file key is generated by encrypting the file key with an encryption key that is accessible to the first computerized system. The request to receive the second encrypted file key may include the first encrypted file key and the message authentication code.

Stage 235 may be followed by stage 240 of receiving, by the third computerized system, the request to receive the second encrypted file key.

Stage 240 may be followed by stage 245 of determining by the third computerized system whether to provide the second encrypted key. The determination may include applying an access control scheme. If determining not to provide the second encrypted key then jumping to denial stage 222. Else—stage 245 is followed by stage 250 of requesting, by the third computerized system from the second computerized system to receive the second encrypted file key.

Stage 250 is followed by stage 260 of receiving by the second computerized system the request to receive the second encrypted file key.

Stage 260 may be followed by stage 265 of determining by the second computerized system whether to provide the second encrypted key. The determination may include applying an access control scheme.

If determining not to provide the second encrypted key then jumping to denial stage 222. Else—stage 265 is followed by stage 270 of decrypting the encrypted file key by a second computerized system decryption key to provide the file key and encrypting the file key using an encryption key of the first computerized system to provide the second encrypted file key. Thereby the second computerized system (such as a company system) can control the distribution of the file key. It can prevent a first computerized system from obtaining the file key if the user of the first computerized system no longer should encrypt the file.

Stage 270 may be followed by stage 280 of providing the second encrypted file key to the first computerized system.

This may include sending the second encrypted file key from the second computerized system to the third computerized system and then to the first computerized system. Alternatively, this may include providing the second encrypted file key from the third to the first computerized system.

The 280 may be followed by stage 290 of decrypting the second encrypted file key by the first computerized system using a decryption key that is accessible to the first computerized system—to provide a file key.

Stage 290 may be followed by stage 295 of decrypting the file entity using the file key.

While stages 110-180 illustrate an encryption that is triggered by a reception or generation of a file by the first computerized system, method 100 can also include stages 310-380 of for encrypting a file received or created by the third computerized system.

Stage 310 includes receiving or generating, by the third computerized system, another file to be encrypted, wherein the other file is associated with other file metadata.

Stage 310 may be followed by stages 320 and 330.

Stage 320 may include processing, by the third computerized system, the other file to provide another file key.

Stage 330 of processing, by the third computerized system, the other file metadata to provide another message authentication code, wherein the processing of the other file metadata involves utilizing the other file key.

Stage 320 may be followed by stages 340 and 350.

Stage 340 may include encrypting, by the third computerized system, another file entity of the other file using the other file key to provide another encrypted file entity; wherein the other file entity may include at least a portion of the other file.

Stage 350 may include encrypting, by the third computerized system, the other file key with the encryption key of the second computerized system to provide another first encrypted file key.

Stages 320, 340 and 340 may be followed by stage 360 of and generating, by the third computerized system, other file information that may include multiple other file information entities that are separable from each other. The multiple other file information entities may include the other encrypted file entity, information about the other file metadata, the other message authentication code and the other first encrypted key. The method may include deleting the other file key.

Figure 4:
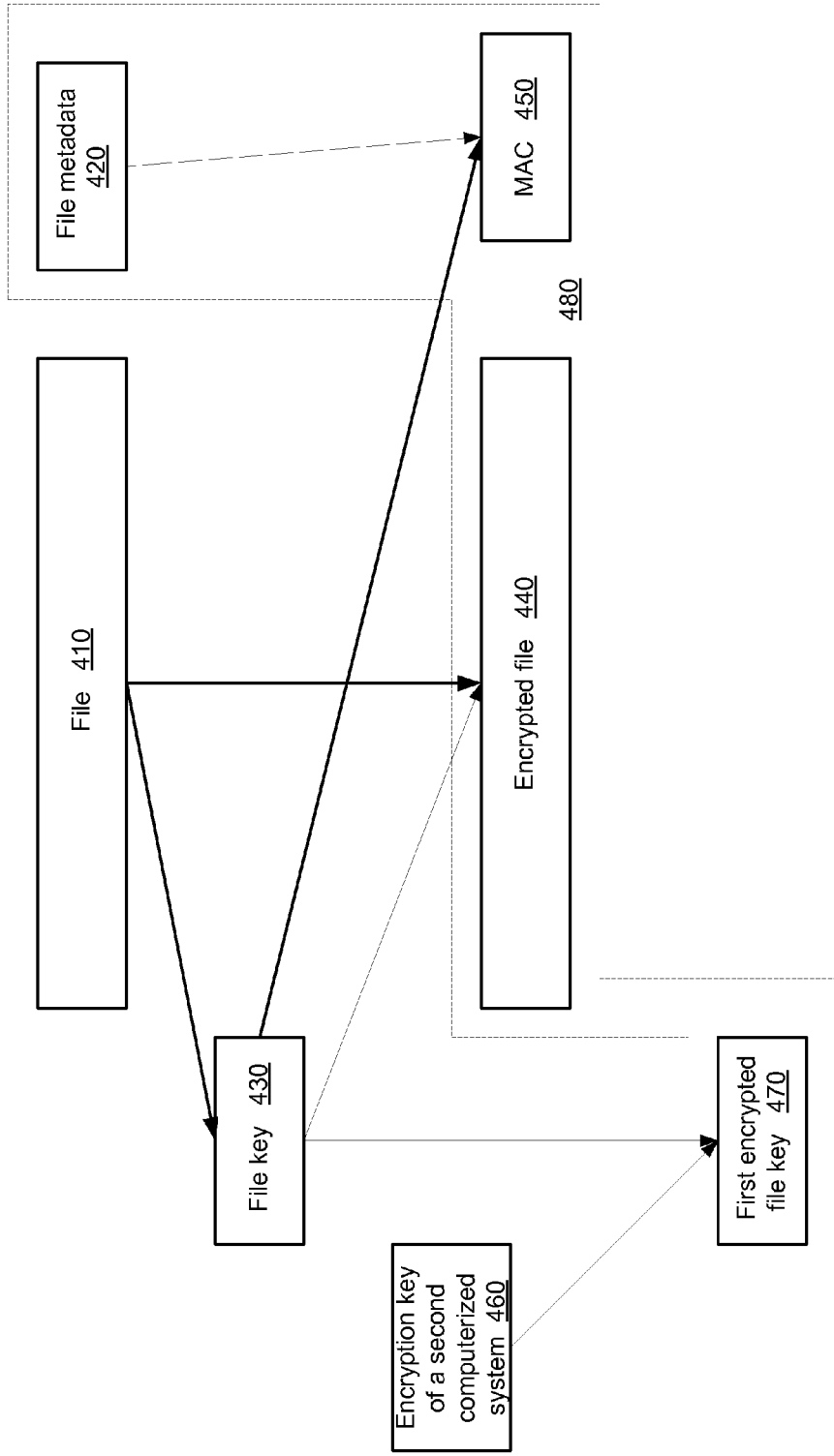
FIGS. 4-5 illustrates data structures according to various embodiments of the invention.

FIG. 4 illustrates various data structures according to an embodiment of the invention.

In FIG. 4 it is assumed that the entire file is encrypted (file entity=file) and that the file metadata included in the file information is not encrypted.

FIG. 4 illustrates file (clear file) 410, file metadata 420, file key 430, encrypted file 440, message authentication code (MAC) 450, encryption key of a second computerized system 460, encrypted file key 470 and file information 480. File information 480 include file information entities such as encrypted file 440, encrypted file key 470, file metadata 420 and MAC 450.

Figure 5:
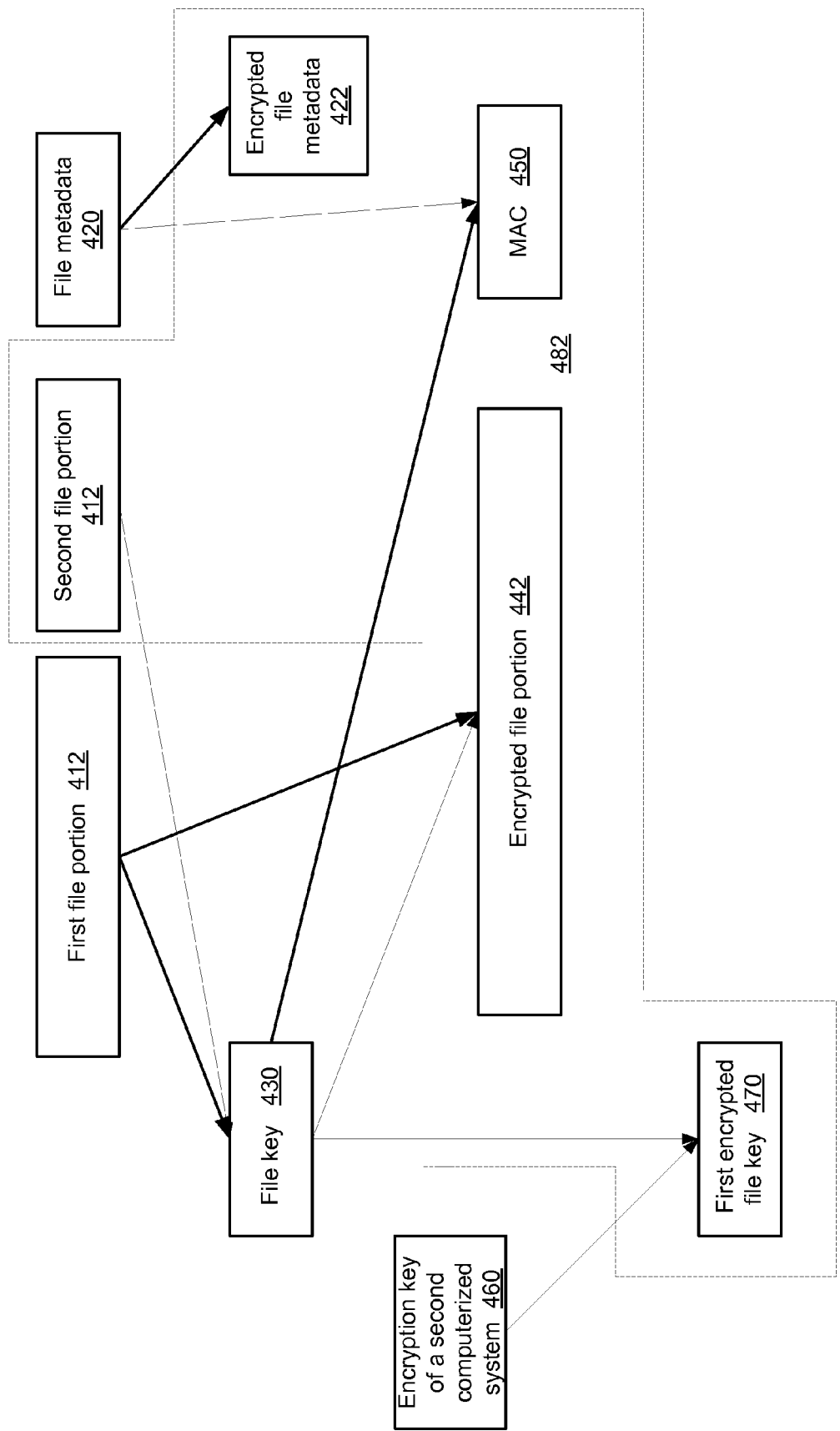

FIG. 5 illustrates various data structures according to an embodiment of the invention.

In FIG. 5 it is assumed that only a portion of the file is encrypted (file entity<file) and that the file metadata included in the file information is encrypted.

FIG. 5 illustrates file (clear file) 410 (including first and second file portions 412 and 414), file metadata 420, encrypted file metadata 422, file key 430, encrypted file portion 442, message authentication code (MAC) 450, encryption key of a second computerized system 460, encrypted file key 470 and file information 482.

File information 482 include file information entities such encrypted file portion 442, second (non-encrypted) file portion 414, encrypted file key 470, encrypted file metadata 422 and MAC 450.

According to an embodiment of the invention the EECS cloud service has the ability to conceal files encryption keys from EECS while keeping all other functionalities. This is important to enterprises which are not willing to have their content decrypted by any other party. The cloud service may be extended with a simple software component owned by the enterprise and installed on user devices.

Files keys will be delivered from this component to the enterprises devices through the EECS service, encrypted by keys unknown to the cloud service.

There is a provided a scheme that makes files encryption keys invisible to EECS, so no employee or intruder to the EECS can decrypt a file. This scheme still allows the EECS to be a cloud SaaS offering while minimizing the amount of code, state information and processing that need to be reside at the enterprise customer premises. This scheme allows keeping access control, access permissions, user authentication and management functionalities in the cloud, operated by the EECS. Finally, when client access control is approved, the EECS can get the right key from the program running at the customer premises encrypted by another key which is known to that corresponding client.

The general setup of a EECS is depicted in FIG. 1.

The EECS server sits in the middle of the system. It includes enterprise accounts, each separated to multiple user accounts. Typically user accounts are setup by enterprise IT for the employees. This can be automated through the export of Active Directory data.

Each user has multiple user devices on which encryption/decryption apps are installed. They can be downloaded from EECS or pre-installed to user devices by a centralized IT facility.

The EECS can also be connected to file repositories and conduct directly the encryption of selected user and enterprise designated files and folders. It provides user and admin control dashboards from which encryption, decryption, access and sharing policies can be configured.

The EECS serves as an access control center by which requests for decryption keys are sent to the EECS along with information regarding the data to be decrypted and the user and device that need to decrypt the data. If the access control policy is met such keys will be sent to the requesting device.

In order to secure the enterprise from exposure to EECS compromising events while keeping the Company ownership of all user data and encryption keys, it may be needed to involve in the access control and key management activity an additional company hosted server. This company hosted server may be required to be involved in the access control and key distribution process. The company hosted server may be implemented by a simple software component owned by the enterprise. Files keys will be delivered from this component to the enterprise's devices through the EECS service, encrypted by keys unknown to the cloud service.

The involvement of an additional company hosted program/server brings the ability to conceal files' encryption keys from EECS while keeping all other functionalities. This is important to enterprises which are not willing to have their content decrypted by any other party.

First Algorithm—Using Two Keys that are Unknown to EECS.

Company private key(s)—this is a fixed key, held by the company. Only the corresponding public key is known to EECS.

Devices key(s)—can be created independently on each device using unique user name, device identity and a secret user password or can be pushed to manage devices using MDM (Mobile Device Management). If it is a single pushed key, can be replaced, companywide, if a device is lost or stolen. The key can be symmetric or public (asymmetric). In case a pushed public key is used, it can be authenticated through a certificate through a trusted third part.

On Device Encryption.

Every time a file is to be encrypted on device, we assume it is also accompanied by an access metadata of an arbitrary length. This metadata may include the file name, description of the file, file classification, type and tags, file security level, possible access modes, the identity of the owner, owner's device, owner's department, team and organization as well as accumulated revision history.

The user device encryption process includes:

a. Use file's data hash (such as SHA-2 or SHA1) to produce a (symmetric) file key. This method is known in the literature as convergent encryption.
b. Conduct a keyed-hash message authentication code (HMAC) of metadata using as the HMAC key the above file key.
c. Encrypt file (metadata fields such as file name and other native file properties may also be encrypted) using file key.
d. Encrypt the file key with Company public key (can be done to all metadata field).
e. Encode the encrypted file in a way that the encrypted file key, the metadata (encrypted or not) and the metadata HMAC, can be separated from the body of the encrypted file by any entity that gets the file. Without loss of generality combing the encrypted file with the rest of the information termed file metadata can be done in any way that can be reversed.

On Cloud, EECS Encryption

In certain cases, the EECS cloud server needs to encrypt a file (such as files that were uploaded to the cloud storage service without on-device encryption, through the web or unequipped device). The cloud encryption algorithm is identical to on device encryption. File keys are destroyed after step (5) and never stored on the cloud service related to the EECS.

EECS Cloud Server Algorithm Following File Key Request Received from a Device:

a. Whenever a user attempts to decrypt a file on the device and the key is not already cached on this device, its send a file request message to the EECS cloud server. Such request includes the encrypted file key, the file access metadata, the metadata HMAC. The request may also include the requester credentials such as the device, user, team and company identities, in case they are not already known at the server. The request may also include the device own encrypted symmetric key (encrypted by the company public key) or device public key. This device key will be used to encrypt the file keys sent back to the device concealed from the EECS.
b. Make an access control decision using the access metadata, requested user and device identity (assuming metadata is not encrypted), if fails block the request.
c. If the access control decision is positive send the encrypted file key to company hosted program for decryption with company's private key (may be accompanied by encrypted or unencrypted file metadata used for logs, for refining access control or for discovering special case accesses such as subpoena. May also include the encrypted device key or device public key of the requesting device).
d. In case the company hosted program does not block this access, get back from company hosted program the file key, encrypted using device (public or symmetric) key.
e. If the (encrypted) file key is received back from company hosted program, along with confirmation of HMAC for metadata integrity, optional re-confirmation or block of access, forward the (encrypted) file key received from company server, back to the requesting device.
f. Log the file access and at file owner account (according to file metadata).
g. Potentially cache the received encrypted key for future use Company Hosted Program Company hosts a simple stateless program, hosted in company DMZ or in the cloud:

a. Get a file key decrypt request from EECS cloud server. Decrypt using company private key, and verify HMAC and access metadata integrity.
b. Optionally refine access control decision. Report back a blocked access if HMAC check or access controls refining fails.
c. If access is cleared, encrypt the file key with public (or symmetric) device key, send to EECS along with confirmation of metadata.
d. Potentially log all accesses.
e. In case of external sharing, the company program may also authenticate the requesting device public key and compare it against its enabled collaborator.

The first algorithm exhibits the following:

a. ECS cloud server cannot decrypt files and holds no file keys. It is never exposed to file keys used for on device encryption.
b. Company can decrypt all files, log accesses and even block them.
c. Device keys are only used for transmitting file keys from company program through EECS to the device and are not part of any file metadata. Therefore they can be replaced when needed, or even locally generated on every device.

Second Algorithm—Allows Verification of Metadata HMAC at EECS

Figure 6:
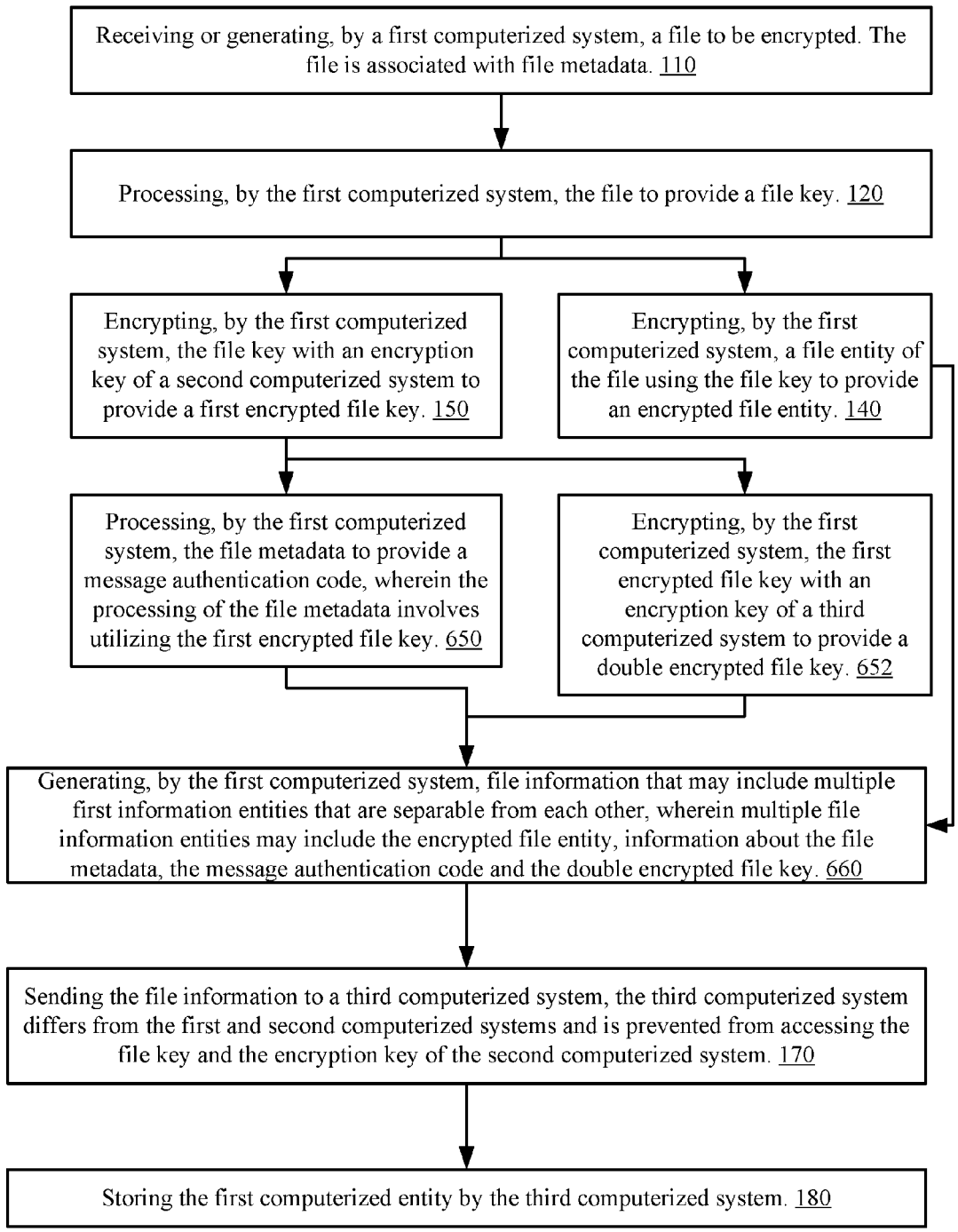
FIGS. 6-8 illustrate a method according to an embodiment of the invention.
Figure 7:
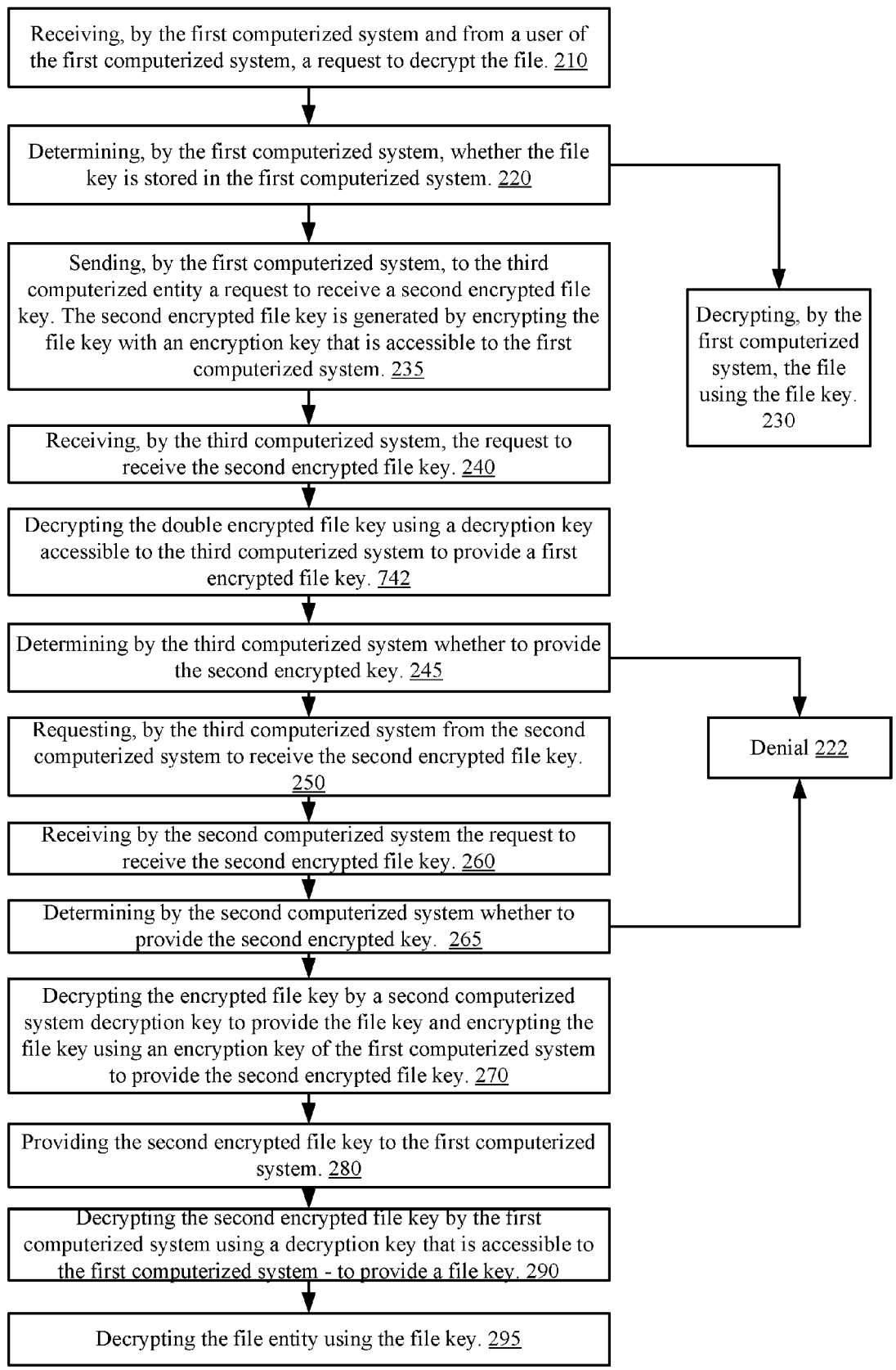
Figure 8:
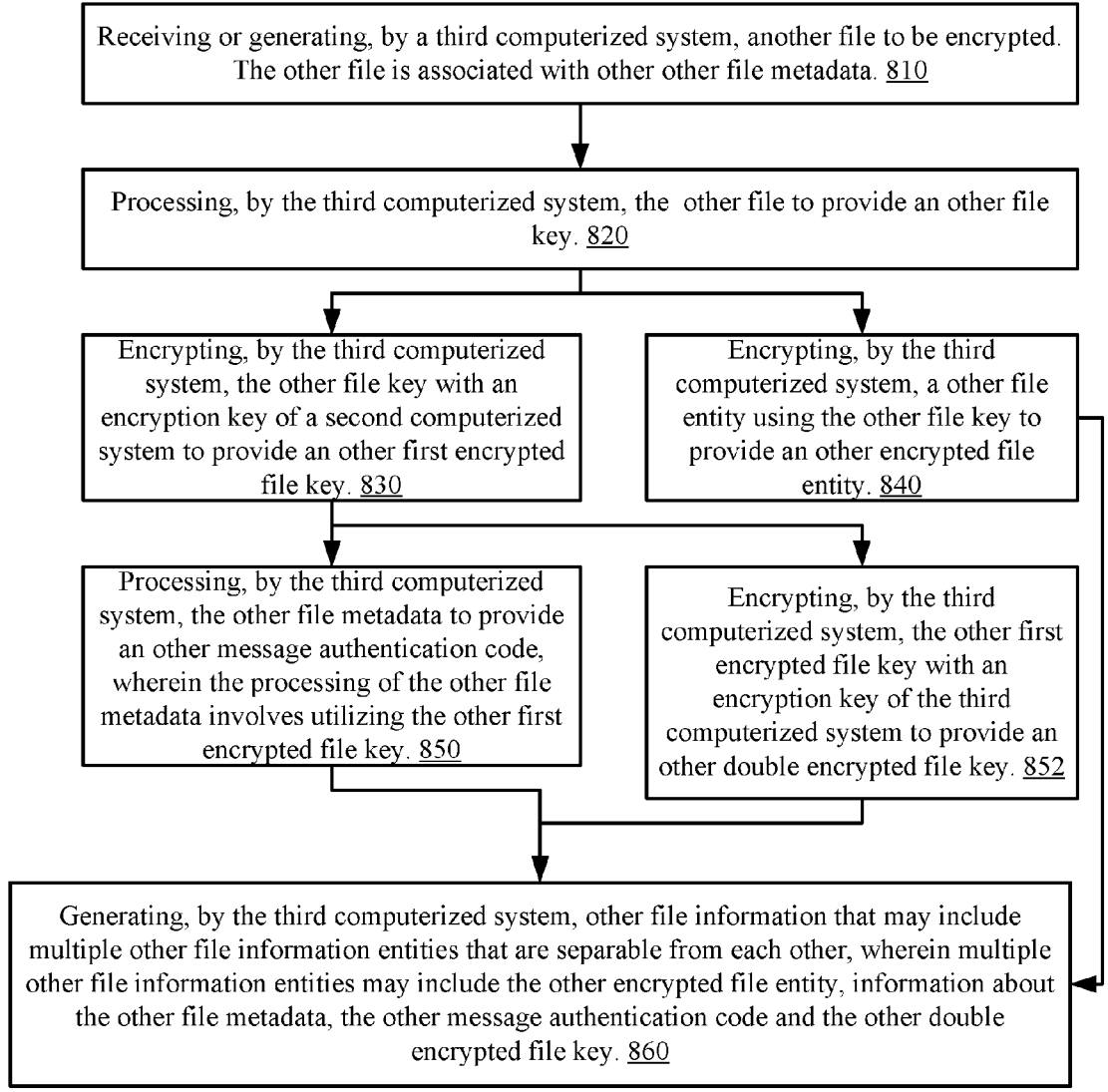

FIG. 6-8 illustrate method 600 according to an embodiment of the invention.

Method 600 may start by stage 110 of receiving or generating, by a first computerized system, a file to be encrypted. The file is associated with file metadata. The file metadata may include, for example, file access control metadata.

Stage 110 may be followed by stage 120 of processing, by the first computerized system, the file to provide a file key. This may include applying a hash function.

Stage 120 may be followed by stages 140 and 150.

Stage 140 may include encrypting, by the first computerized system, a file entity of the file using the file key to provide an encrypted file entity. The file entity may include the entire file or a portion of the file. In the latter case another portion of the file is left non-encrypted. For simplicity of explanation it is assumed that the file entity is the file itself.

Stage 150 may include encrypting, by the first computerized system, the file key with an encryption key of a second computerized system to provide a first encrypted file key.

Stage 150 may be followed by stages 650 and 652.

Stage 650 may include processing, by the first computerized system, the file metadata to provide a message authentication code, wherein the processing of the file metadata involves utilizing the first encrypted file key.

Stage 652 may include encrypting, by the first computerized system, the first encrypted file key with an encryption key of a third computerized system to provide a double encrypted file key.

Stages 140, 650 and 650 may be followed by stage 660 of generating, by the first computerized system, file information that may include multiple first information entities that are separable from each other, wherein multiple file information entities may include the encrypted file entity, information about the file metadata, the message authentication code and the double encrypted file key. The generating may include encoding. The term separable means that a computerized entity that receives the file information may separate (for example by parsing) the file information entities from each other.

If the file includes a non-encrypted portion then it may be regarded as file information entity and may be a part of the file information.

Stage 660 may be followed by stage 170 of sending the file information to a third computerized system, the third computerized system differs from the first and second computerized systems and is prevented from accessing the file key and the encryption key of the second computerized system.

Stage 170 may be followed by stage 180 of storing the first computerized entity by the third computerized system.

Stages 110-180 may be executed for each file to be encrypted. Thus, stage 180 may be followed (dashed arrow) by stage 110.

FIG. 7 illustrates a part of method 600 according to an embodiment of the invention.

FIG. 7 differs from FIG. 2 by including stage 742 to be executed between stage 270 and 275. Stage 742 includes decrypting the double encrypted file key using a decryption key accessible to the third computerized system to provide a first encrypted file key.

While stages 110, 120, 140, 150, 650, 652, 660, 170 and 180 illustrate an encryption that is triggered by a reception or generation of a file by the first computerized system, method 600 can also include stages 810-880 of for encrypting a file received or created by the third computerized system.

Stage 810 includes receiving or generating, by the third computerized system, another file to be encrypted, wherein the other file is associated with other file metadata.

Stage 810 may be followed by stage 820 of processing, by the third computerized system, the other file to provide another file key.

Stage 820 may be followed by stages 830 and 840.

Stage 840 may include encrypting, by the third computerized system, another file entity of the other file using the other file key to provide another encrypted file entity; wherein the other file entity may include at least a portion of the other file.

Stage 830 may include encrypting, by the third computerized system, the other file key with the encryption key of the second computerized system to provide another first encrypted file key.

Stage 830 may be followed by stages 850 and 852.

Stage 850 may include processing, by the third computerized system, the other file metadata to provide another message authentication code, wherein the processing of the other file metadata involves utilizing the other file key.

Stage 852 may include encrypting, by the third computerized system, the first encrypted file key with an encryption key of the third computerized system to provide a double encrypted file key.

Stages 840, 850 and 852 may be followed by stage 860 of and generating, by the third computerized system, other file information that may include multiple other file information entities that are separable from each other. The multiple other file information entities may include the other encrypted file entity, information about the other file metadata, the other message authentication code and the other first encrypted key. The method may include deleting the other file key.

Figure 9:
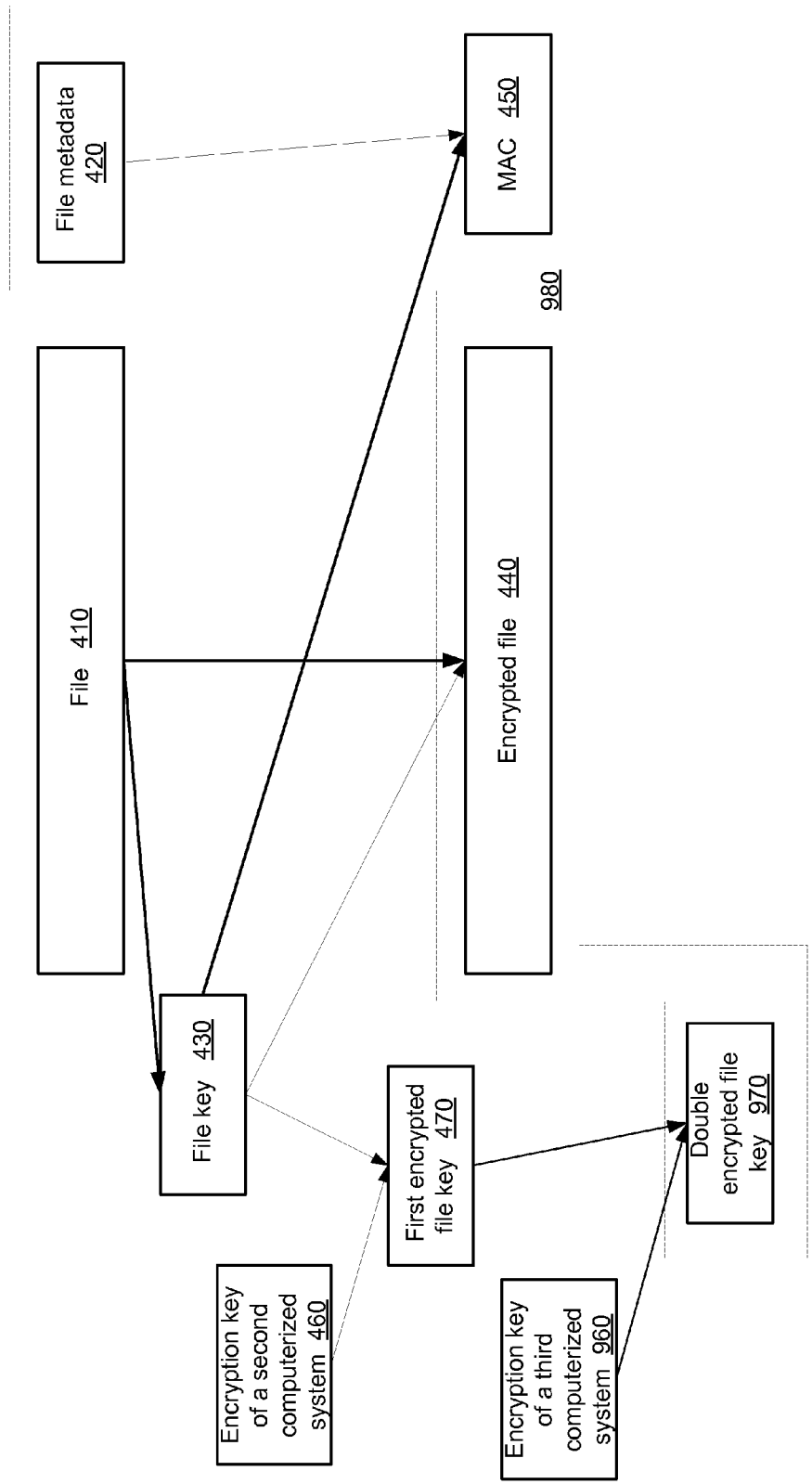
FIG. 9 illustrates data structures according to an embodiment of the invention.

FIG. 9 illustrates various data structures according to an embodiment of the invention.

In FIG. 9 it is assumed that the entire file is encrypted (file entity=file) and that the file metadata included in the file information is not encrypted.

FIG. 9 illustrates file (clear file) 410, file metadata 420, file key 430, encrypted file 440, message authentication code (MAC) 450, encryption key of a second computerized system 460, encrypted file key 470, encryption key of a third computerized system 960 and double encrypted file key 970.

In the mentioned above algorithm the computerized systems use three keys that are not known to the EECS:

a. EECS—private key for each team, shared with customers that need emergency recovery.

b. Company private key—unknown to EECS—this will be a static fixed key. Company public key is known to EECS and is stored on company devices.

c. Devices key(s), as in first algorithm can be pushed to devices using MDM or can be generated on device. In the former case, can be replaced, companywide, if a device is lost or stolen. Only public key known to EECS.

On Device Encryption a. Use file's data hash (such as SHA-2 or SHA1) to produce a (symmetric) file key.

b. Encrypt file (file name and other native file properties may also be include) using file key.

c. Encrypt the file key with Company public key d. Conduct a keyed-hash message authentication code (HMAC) of metadata using as the HMAC key the encrypted file key (encrypted with company public key)

e. Encrypt the encrypted file key again with EECS public key (can also be done to all metadata).

f. Encode the encrypted file in a way that the double encrypted file key, the metadata (encrypted or not) and the metadata HMAC, can be separated from the body of the encrypted file by any entity that gets the file. Without loss of generality combing the encrypted file with the rest of the information, termed file metadata, can be done in any way that can be reversed.

On EECS Cloud Encryption

In certain cases, the EECS cloud server needs to encrypt a file (such as files that were uploaded to the cloud storage service without on-device encryption, through the web or unequipped device). The cloud encryption algorithm is identical to on device encryption. File keys are destroyed after step (6) and never stored on the cloud service.

ECS cloud server algorithm following file key request from a device:

a. Whenever a user attempts to decrypt a file on the device and the key is not cached, its send a file request message to the EECS cloud server. Such request includes the encrypted file key, the file access metadata, the metadata HMAC. The request may also include the requester credentials such as the device, user, team and company identities, in case they are not already known at the server. The request may also include the device encrypted symmetric key (encrypted by the company public key) or device public key to be used to encrypt the response. This device key will be used to encrypt the response sent back to the device.

b. Decrypts the double encrypted file key using EECS cloud server private key, and check the integrity of metadata using HMAC with the once encrypted file key (with Company public key).

c. Make an access control decision using the access metadata, requested user and device identity (assuming metadata is not encrypted), if fails block the request.
d. Send the still encrypted file key to company hosted program for decryption with company's private key (may be accompanied by unencrypted file metadata used for logs, for refining access control or for discovering special case accesses such as subpoena. May also include the encrypted device key or device public key of the requesting device).
e. Get back from company hosted program the file key, encrypted using device (public or symmetric) key.
f. When (encrypted) file key is received back from company server, along with optional re-confirmation or block of access, forward the (encrypted) file key received from company server, back to the requesting device.
g. Log the file access at file owner account (according to file metadata).
h. In case device keys are identical per company, cache the received encrypted key for future use
Company hosts simple stateless software, hosted in DMZ.
Company Hosted Algorithm
a. Get a file key decrypt request from EECS cloud server. Decrypt using company private key.
b. Optionally refine access control decision. Report back a blocked access if access controls refining fails.
c. If access is cleared, encrypt the (unencrypted) file key with public (or symmetric) device key, send to EECS cloud server along with confirmation of metadata.
d. Potentially log all accesses
e. In external sharing, the company server may also authenticate the requesting device public key in case it is an enabled collaborator.

The second algorithm exhibits the following:
a. ECS cloud server cannot decrypt files and holds no file keys. It is never exposed to file keys used for on device encryption.
b. ECS can verify access metadata integrity
c. Company can decrypt all files, log accesses and block them.
d. Device keys are only used for transmitting file keys from company program through EECS to the device and are not part of any file metadata. Therefore they can be replaced when needed, or even locally generated on every device.

Generating Device Private and Public Keys
We assume that each user maintain a user password unknown to and not stored at EECS. Our app and web sign on (using a JavaScript program) produce a second user password using a one way hash program (such as bcrypt) to hide the passwords before sending them to EECS. EECS cloud server use the second user password as EECS password. EECS maintains a user password reset functionality but will not be able to remind users about passwords.

On device, a user private key is generated using the original user password. Therefore, even if EECS knows the private key generation algorithm, the lack knowledge about the user password will prevent EECS from reproducing the user private key. The associated user public key is sent to the EECS server.

Figure 10:
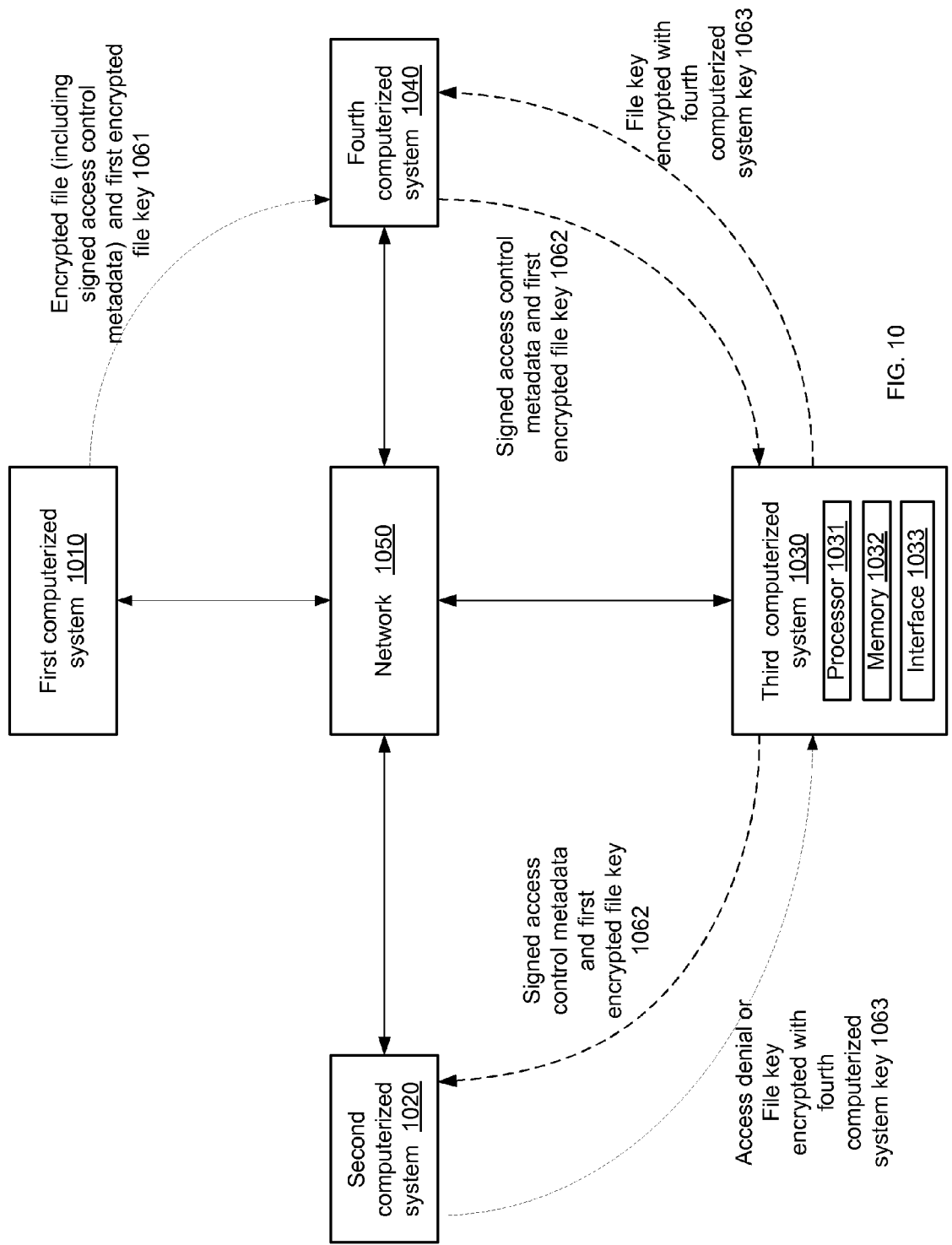
FIG. 10 illustrates four computerized systems according to an embodiment of the invention.

FIG. 10 illustrates first, second, third and fourth computerized systems 1010, 1020, 1030 and 1040 that are connected to network 1050.

The following description provides a non-limiting example of the methods mentioned above. It is assumed that:
a. The first computerized system is a first user device.
b. The second computerized system is a company computer that hosts a company hosted program.
c. The third computerized system is an EECS cloud server.
d. The fourth computerized system is a second user device.
e. The first till fourth computerized systems may use an asymmetrical cryptosystem—therefore decryption keys are private keys and encryption keys are public keys.

FIG. 10 also illustrates signals that are exchanged between these computerized system when a first computerized system 1010 sends to the fourth computerized system an encrypted file entity to be encrypted:
a. Encrypted file (including signed access control metadata and first) and first encrypted key 1061 are sent from first to fourth computerized system.
b. Signed access control metadata and first encrypted file key 1062 are sent from fourth to third computerized system.
c. Signed access control metadata and first encrypted file key 1062 are sent from third to second computerized system.
d. If second computerized system determines that access can be granted to the fourth computerized system—file key encrypted with fourth computerized system key 1063 is send from second to third computerized system and from third to fourth computerized system.

Figure 11:
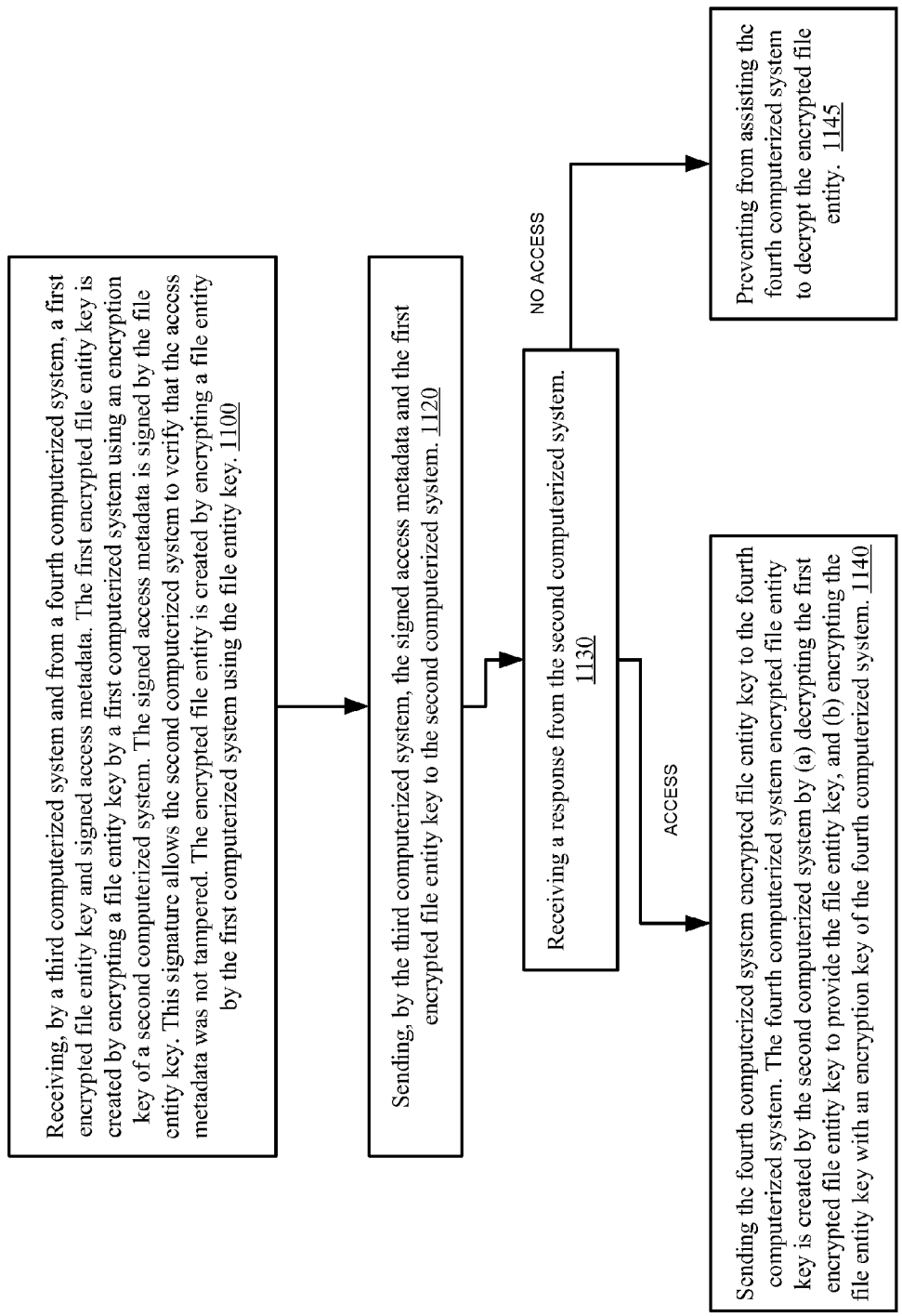
FIG. 11 illustrates a method according to an embodiment of the invention.

FIG. 11 illustrates a method 1100 for participating in an encryption process of an encrypted file entity according to an embodiment of the invention.

Method 1100 may start by stage 1110 of receiving, by a third computerized system and from a fourth computerized system, a first encrypted file entity key and signed access metadata. The first encrypted file entity key is created by encrypting a file entity key by a first computerized system using an encryption key of a second computerized system. The signed access metadata is signed by the file entity key. This signature allows the second computerized system to verify that the access metadata was not tampered. The encrypted file entity is created by encrypting a file entity by the first computerized system using the file entity key. The manner of generating the encrypted file entity, the file key and the first encrypted file key are illustrated in the text above. See, for example FIGS. 1-2.

Stage 1110 may be followed by stage 1120 of sending, by the third computerized system, the signed access metadata and the first encrypted file entity key to the second computerized system.

Stage 1120 may be followed by stage 1130 of receiving a response from the second computerized system.

If access should be granted then the response may include a fourth computerized system encrypted file entity key. In this case stage 1130 is followed by stage 1140 of sending the fourth computerized system encrypted file entity key to the fourth computerized system. The fourth computerized system encrypted file entity key is created by the second computerized system by (a) decrypting the first encrypted file entity key to provide the file entity key, and (b) encrypting the file entity key with an encryption key of the fourth computerized system.

If access should not be granted then the response indicates that the fourth computerized system is not entitled to decrypt the encrypted file and stage 1130 may be followed by stage 1145 of preventing from assisting the fourth computerized system to decrypt the encrypted file entity. Stage 1145 may include not sending the fourth computerized system encrypted file entity key to the first computerized system.

Figure 12:
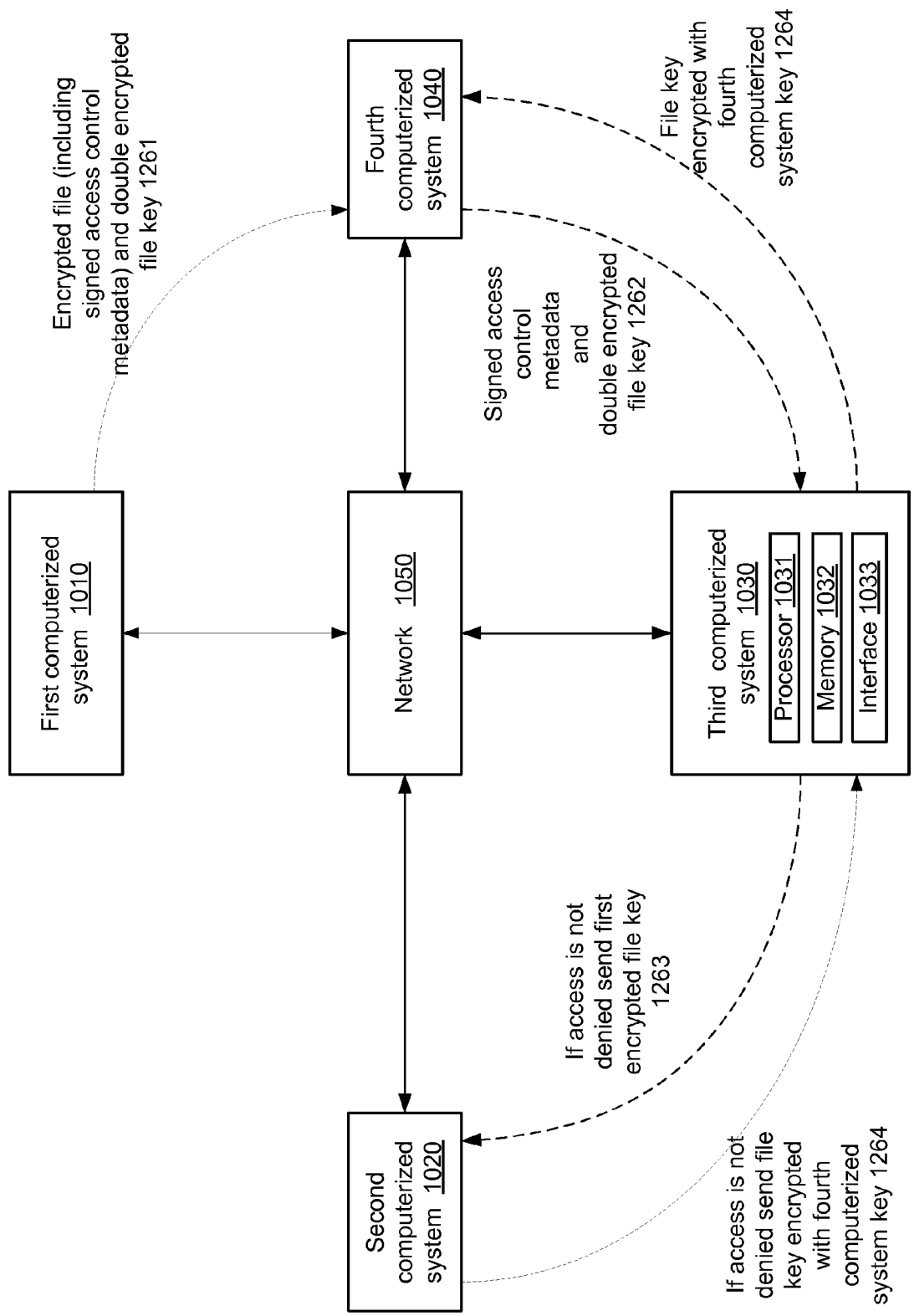
FIG. 12 illustrates a method according to an embodiment of the invention.

FIG. 12 illustrates first, second, third and fourth computerized systems 1010, 1020, 1030 and 1040 that are connected to network 1050. Third computerized system 1030 may include a processor 1031, memory 1032 and interface 1033. The interface 1033 facilitates communication with other entities.

The following description provides a non-limiting example of the methods mentioned above. It is assumed that:

a. The first computerized system is a first user device.
b. The second computerized system is a company computer that hosts a company hosted program.
c. The third computerized system is an EECS cloud server.
d. The fourth computerized system is a second user device.
e. The first till fourth computerized systems may use an asymmetrical cryptosystem—therefore decryption keys are private keys and encryption keys are public keys.

FIG. 12 also illustrates signals that are exchanged between these computerized system when a first computerized system sends to the fourth computerized system an encrypted file entity to be encrypted:

a. Encrypted file (including signed access control metadata and first) and double encrypted key 1261 are sent from first to fourth computerized system.
b. Signed access control metadata and double encrypted file key 1262 are sent from second to third computerized system.
c. Third entity determines based upon the signed access metadata whether the fourth computerized system should be granted access to the file entity. If not access should be provide—the third computerized entity may stop the decryption process.
d. Else—the third computerized system decrypts the double encrypted file key to provide a first encrypted key file 1263 that is sent from third to second computerized system.
e. A file key encrypted with fourth computerized system key 1264 is sent from second to third computerized system and from third to fourth computerized system.

Figure 13:
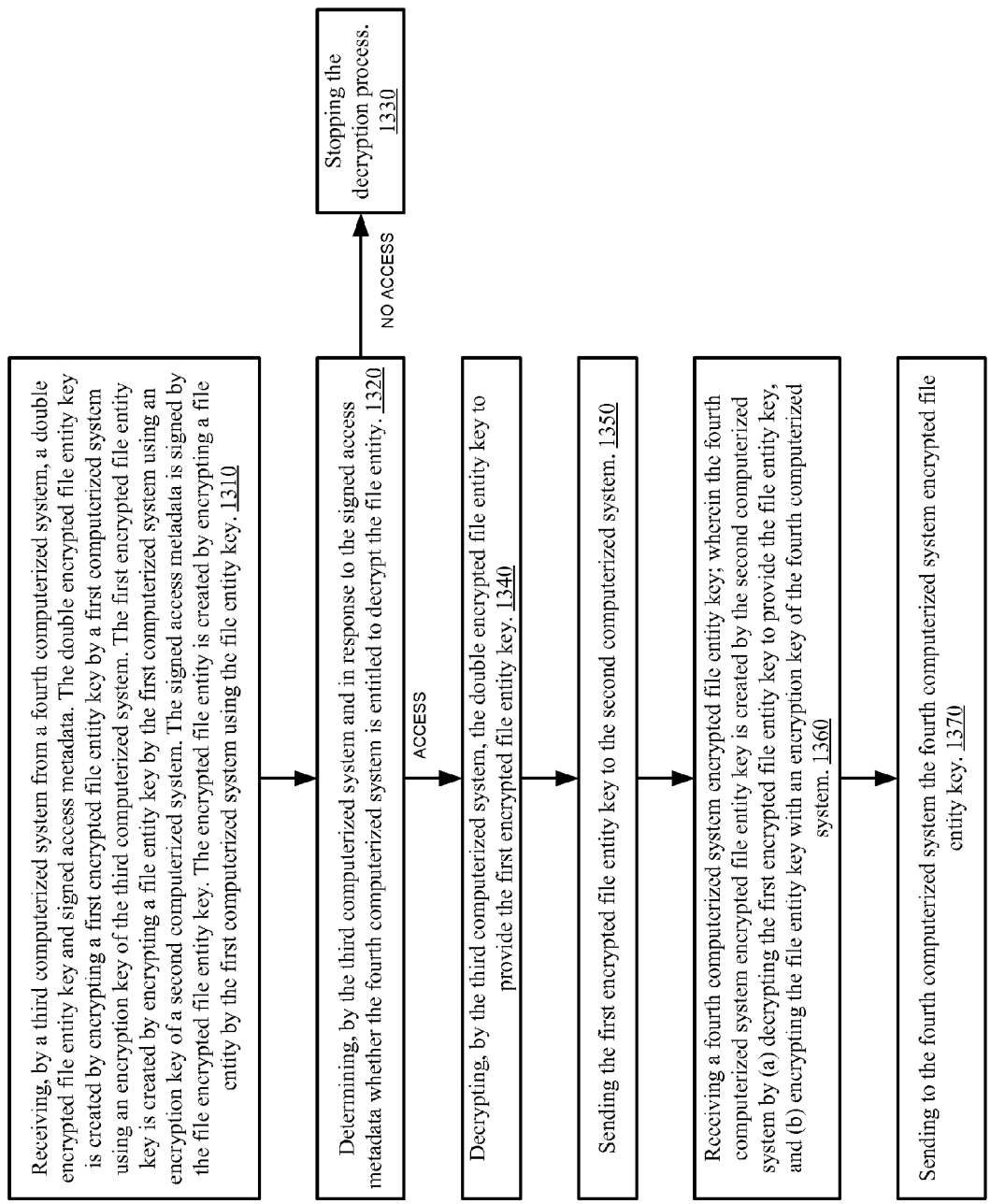
FIG. 13 illustrates a method according to an embodiment of the invention.

FIG. 13 illustrates a method 1300 for participating in an encryption process of an encrypted file entity according to an embodiment of the invention.

Method 1300 may start by stage 1310 of receiving, by a third computerized system and from a fourth computerized system, a double encrypted file entity key and signed access metadata. The double encrypted file entity key is created by encrypting a first encrypted file entity key by a first computerized system using an encryption key of the third computerized system. The first encrypted file entity key is created by encrypting a file entity key by the first computerized system using an encryption key of a second computerized system. The signed access metadata is signed by the file entity key or the first encrypted file entity key. The encrypted file entity is created by encrypting a file entity by the first computerized system using the file entity key. The manner of generating the file key, the first encrypted file key, the double encrypted file key, the first encrypted file entity and the like illustrated in the text above. See, for example FIGS. 6-8.

Stage 1310 may be followed by stage 1320 of determining, by the third computerized system and in response to the signed access metadata whether the fourth computerized system is entitled to decrypt the file entity. Access may be provided if the access metadata was not tampered and indicates that such access should be provided.

If it is determined that the fourth computerized system is not entitled to decrypt the file entity then stage 1320 may be followed by stage 1330 of stopping the decryption process. Stage 1330 may include preventing the third computerized system from assisting the fourth computerized system to decrypt the encrypted file entity.

If it is determined that the fourth computerized system is entitled to decrypt the file entity then stage 1320 is followed by stage 1340 of decrypting, by the third computerized system, the double encrypted file entity key to provide the first encrypted file entity key.

Stage 1340 may be followed by stage 1350 of sending the first encrypted file entity key to the second computerized system.

Stage 1350 may be followed by stage 1360 of receiving a fourth computerized system encrypted file entity key; wherein the fourth computerized system encrypted file entity key is created by the second computerized system by (a) decrypting the first encrypted file entity key to provide the file entity key, and (b) encrypting the file entity key with an encryption key of the fourth computerized system.

Stage 1360 may be followed by stage 1370 of sending to the fourth computerized system the fourth computerized system encrypted file entity key.

FIG. 14 illustrates method 1400 according to an embodiment of the invention.

Method 1400 may start by stage 1410 of receiving, by a third computerized system and from a fourth computerized system, a first encrypted file entity key and signed access metadata. The first encrypted file entity key is created by encrypting a file entity key by a first computerized system using an encryption key of a second computerized system. The signed access metadata is signed by the file entity key. The encrypted file entity is created by encrypting a file entity by the first computerized system using the file entity key.

The signed access metadata may include the identity of the first computerized system. The signed access metadata may include information about a group of one or more computerized entities that are entitled to decrypt the encrypted file portion.

Stage 1410 may be followed by stage 1420 of sending, by the third computerized system, the signed access metadata and the first encrypted file entity key to the second computerized system.

Stage 1420 may be followed by stage 1430 of receiving a response from the second computerized system.

Stage 1430 may be followed by stage 1440 of determining, based on the response from the second computerized system, whether to facilitate a decryption of the encrypted file entity by the fourth computerized entity.

Stage 1440 may include determining not to facilitate the decryption if the response of the second computerized system indicates that the signed access data is invalid.

Stage 1440 may include determining whether to facilitate the decryption of the encrypted file entity by the fourth computerized entity in response to a content of the signed access data if the response indicates that the signed access data is valid.

If the answer is yes (facilitate decryption) then stage 1440 may be followed by stage 1450 of sending a fourth computerized system encrypted file entity key to the fourth computerized system. The fourth computerized system encrypted file entity key is created by the second computerized system by (a) decrypting the first encrypted file entity key to provide the file entity key, and (b) encrypting the file entity key with an encryption key of the fourth computerized system.

If the answer is no (do not facilitate decryption) then stage 1440 may be followed by stage 1460 of preventing from assisting the fourth computerized system to decrypt the encrypted file entity. This may include not sending any decryption key to the fourth computerized system.

The file entity to be decrypted may be the entire file or a first portion of the file. The file may include a second portion that is not encrypted.

The method may include preventing the third computerized system from accessing the file key.

The first, second, third and fourth computerized entities may differ from each other.

The signed access metadata may be generated during the encryption of the file.

It is noted that in methods 1100, 1300 and 1400 an encryption key may allow encryption but not decryption. A computerized system may be prevented from accessing decryption keys of other computerized systems.

Any method mentioned in the specification may be executed by any system mentioned in the specification.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems.'

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for selectively assisting a fourth computerized system in a decryption of an encrypted file entity, the method comprises:
   receiving, by a third computerized system from the fourth computerized system, a first encrypted file entity key and signed access metadata;
      wherein the first encrypted file entity key is created by encrypting a file entity key by a first computerized system using an encryption key of a second computerized system;
      wherein the signed access metadata is signed by the file entity key;
      wherein the encrypted file entity is created by encrypting a file entity by the first computerized system using the file entity key;
   sending, by the third computerized system, the signed access metadata and the first encrypted file entity key to the second computerized system;
   receiving a response from the second computerized system;
   determining, based on the response from the second computerized system, whether to facilitate the decryption of the encrypted file entity by the fourth computerized system;
   wherein if determining to facilitate the decryption of the encrypted file entity by the fourth computerized system then sending, by the third computerized system, a fourth computerized system encrypted file entity key to the fourth computerized system; wherein the fourth computerized system encrypted file entity key is created by the second computerized system by (a) decrypting the first encrypted file entity key to provide the file entity key, and (b) encrypting the file entity key with an encryption key of the fourth computerized system; and
   wherein if determining not to facilitate the decryption of the encrypted file entity by the fourth computerized system then preventing from assisting the fourth computerized system to decrypt the encrypted file entity.

2. The method according to claim 1 wherein the file entity is a file.

3. The method according to claim 1 wherein the file entity is a first portion of a file.

4. The method according to claim 3, wherein the file further comprises a second file portion that is not encrypted by the file key.

5. The method according to claim 1 comprising preventing the third computerized system from accessing the file key.

6. The method according to claim 1 wherein the first, second, third and fourth computerized systems differ from each other.

7. The method according to claim 1 comprising determining not to facilitate the decryption of the encrypted file entity by the fourth computerized system if the response indicates that the signed access data is invalid.

8. The method according to claim 1 comprising determining whether to facilitate the decryption of the encrypted file entity by the fourth computerized system in response to a content of the signed access data if the response indicates that the signed access data is valid.

9. The method according to claim 1 wherein the signed access metadata comprises an identity of the first computerized system.

10. The method according to claim 1 wherein the signed access metadata comprises information about a group of computerized entities that are entitled to decrypt the encrypted file portion.

11. A method for selectively assisting a fourth computerized system in a decryption of an encrypted file entity, the method comprises:
   receiving, by a third computerized system from the fourth computerized system, a double encrypted file entity key and signed access metadata;
      wherein the double encrypted file entity key is created by encrypting a first encrypted file entity key by a first computerized system using an encryption key of the third computerized system;

wherein the first encrypted file entity key is created by encrypting a file entity key by the first computerized system using an encryption key of a second computerized system;

wherein the signed access metadata is signed by the first encrypted file entity key;

wherein the encrypted file entity is created by encrypting a file entity by the first computerized system using the file entity key;

determining, by the third computerized system and in response to the signed access metadata whether the fourth computerized system is entitled to decrypt the file entity;

if it is determined that the fourth computerized system is not entitled to decrypt the file entity then preventing from assisting the fourth computerized system to decrypt the encrypted file entity;

if it is determined that the fourth computerized system is entitled to decrypt the file entity then:

decrypting, by the third computerized system, the double encrypted file entity key to provide the first encrypted file entity key;

sending, by the third computerized system, the first encrypted file entity key to the second computerized system;

receiving, by the third computerized system, a fourth computerized system encrypted file entity key; wherein the fourth computerized system encrypted file entity key is created by the second computerized system by (a) decrypting the first encrypted file entity key to provide the file entity key, and (b) encrypting the file entity key with an encryption key of the fourth computerized system; and sending, by the third computerized system, to the fourth computerized system the fourth computerized system encrypted file entity key.

12. The method according to claim 11 wherein the file entity is a file.

13. The method according to claim 11 wherein the file entity is a first portion of a file.

14. The method according to claim 13, wherein the file further comprises a second file portion that is not encrypted by the file key.

15. The method according to claim 11 comprising preventing the third computerized system from accessing the file key.

16. The method according to claim 11 wherein the first, second, third and fourth computerized systems differ from each other.

17. A non-transitory computer readable medium storing computer executable instructions that once executed by a third computerized system causes the third computerized system to selectively assist in a decryption of an encrypted file entity by a fourth computerized system by executing the stages of:

receiving, by a third computerized system from the fourth computerized system, a first encrypted file entity key and signed access metadata;

wherein the first encrypted file entity key is created by encrypting a file entity key by a first computerized system using an encryption key of a second computerized system;

wherein the signed access metadata is signed by the file entity key;

wherein the encrypted file entity is created by encrypting a file entity by the first computerized system using the file entity key;

sending, by the third computerized system, the signed access metadata and the first encrypted file entity key to the second computerized system;

receiving, by the third computerized system, a response from the second computerized system;

determining, by the third computerized system, based on the response from the second computerized system, whether to facilitate a decryption of the encrypted file entity by the fourth computerized entity;

wherein if determining to facilitate the decryption of the encrypted file entity by the fourth computerized system then sending, by the third computerized system, a fourth computerized system encrypted file entity key to the fourth computerized system;

wherein the fourth computerized system encrypted file entity key is created by the second computerized system by (a) decrypting the first encrypted file entity key to provide the file entity key, and (b) encrypting the file entity key with an encryption key of the fourth computerized system; and wherein if determining not to facilitate the decryption of the encrypted file entity by the fourth computerized system then preventing from assisting the fourth computerized system to decrypt the encrypted file entity.

18. A non-transitory computer readable medium storing computer executable instructions that once executed by a third computerized system causes the third computerized system to selectively assist in a decryption of an encrypted file entity by a fourth computerized system by executing the steps of:

receiving, by the third computerized system from the fourth computerized system, a double encrypted file entity key and signed access metadata; wherein the double encrypted file entity key is created by encrypting a first encrypted file entity key by a first computerized system using an encryption key of the third computerized system; wherein the first encrypted file entity key is created by encrypting a file entity key by the first computerized system using an encryption key of a second computerized system; wherein the signed access metadata is signed by the first encrypted file entity key; wherein the encrypted file entity is created by encrypting a file entity by the first computerized system using the file entity key;

determining in response to the signed access metadata whether the fourth computerized system is entitled to decrypt the file entity;

if it is determined that the fourth computerized system is not entitled to decrypt the file entity then preventing from assisting the fourth computerized system to decrypt the encrypted file entity;

if it is determined that the fourth computerized system is entitled to decrypt t the file entity then:

decrypting the double encrypted file entity key to provide the first encrypted file entity key;

sending, by the third computerized system, the first encrypted file entity key to the second computerized system;

receiving, by the third computerized system, a fourth computerized system encrypted file entity key; wherein the fourth computerized system encrypted file entity key is created by the second computerized system by (a) decrypting the first encrypted file entity key to provide the file entity key, and (b) encrypting the file entity key with an encryption key of the fourth computerized system; and sending, by the third computerized system, to the fourth computerized system the fourth computerized system encrypted file entity key.

19. A computer comprising a memory, an interface and a processor; the computer is configured to selectively assist in a decryption of an encrypted file entity by a fourth computerized system;

wherein the interface is arranged to receive from the fourth computerized system, a double encrypted file entity key and signed access metadata; wherein the double encrypted file entity key is created by encrypting a first encrypted file entity key by a first computerized system using an encryption key of the third computerized system; wherein the first encrypted file entity key is created by encrypting a file entity key by the first computerized system using an encryption key of a second computerized system; wherein the signed access metadata is signed by the first encrypted file entity key; wherein the encrypted file entity is created by encrypting a file entity by the first computerized system using the file entity key;

wherein the processor is arranged to determine in response to the signed access metadata whether the fourth computerized system is entitled to decrypt the file entity;

if it is determined that the fourth computerized system is not entitled to decrypt he file entity then the computer is arranged to prevent from assisting the fourth computerized system to decrypt the encrypted file entity;

if it is determined that the fourth computerized system is entitled to decrypt the file entity then:

the processor is arranged to decrypt the double encrypted file entity key to provide the first encrypted file entity key;

the interface is arranged to send the first encrypted file entity key to the second computerized system and to receive a fourth computerized system encrypted file entity key; wherein the fourth computerized system encrypted file entity key is created by the second computerized system by (a) decrypting the first encrypted file entity key to provide the file entity key, and (b) encrypting the file entity key with an encryption key of the fourth computerized system; and to send to the fourth computerized system the fourth computerized system encrypted file entity key.

* * * * *